United States Patent [19]
Kargarzadeh et al.

[11] Patent Number: 5,104,596
[45] Date of Patent: Apr. 14, 1992

[54] METHOD FOR MAKING 360 SAILS ON COMPOSITE DOORS

[75] Inventors: Reza Kargarzadeh, Riceville; Ellis E. Gosnell, Athens, both of Tenn.

[73] Assignee: Davidson Textron Inc., Dover, N.H.

[21] Appl. No.: 669,661

[22] Filed: Mar. 14, 1991

Related U.S. Application Data

[63] Continuation of Ser. No. 399,253, Aug. 28, 1989, abandoned.

[51] Int. Cl.$^5$ ............................................. B29C 67/22
[52] U.S. Cl. ............................. 264/46.5; 264/46.6; 264/278; 264/301
[58] Field of Search ................... 264/46.7, 46.4, 46.5, 264/46.6, 45.1, 275, 278, 302, 301

[56] References Cited

U.S. PATENT DOCUMENTS

| | | | |
|---|---|---|---|
| 4,369,562 | 1/1983 | Lyonnet | 264/46.7 |
| 4,381,908 | 5/1983 | Roth | 264/278 |
| 4,420,447 | 12/1983 | Nakashima | 264/46.7 |
| 4,572,856 | 2/1986 | Gembinski | 264/46.7 |
| 4,606,868 | 8/1986 | Christoph et al. | 425/256 |
| 4,753,586 | 6/1988 | Curtis | 264/278 |
| 4,793,784 | 12/1988 | Belleville et al. | 425/111 |
| 4,793,793 | 12/1988 | Swenson et al. | 264/46.5 |

Primary Examiner—Robert A. Dawson
Assistant Examiner—Allan R. Kuhns
Attorney, Agent, or Firm—Reising, Ethington, Barnard, Perry & Milton

[57] ABSTRACT

Apparatus for making composite doors includes means to locate a plastisol skin cover having an integral sail pocket formed therein within a mold cavity having a lid thereon moveable between opened and closed positions. The lid includes a retractable tool for positioning a hollow substrate extension in the sail pocket to both seal against foam leakage into the hollow substrate extension and to center the substrate extension within the pocket for defining a foam reaction space between the pocket and the substrate extension. A method for making integral 360° sails on a composite door includes the steps of casting a fused plastisol skin having an integral 360° sail thereon formed by a pocket with an entry thereto; locating the sail pocket in a mold cavity; closing the mold and thereafter centering a substrate within the mold cavity to form a foam space and to seal the substrate with respect to the plastisol skin to prevent foam leakage through the substrate and thereafter directing foam precursors into the foam space for forming a foam layer therein.

1 Claim, 2 Drawing Sheets

METHOD FOR MAKING 360 SAILS ON COMPOSITE DOORS

This is a continuation of application Ser. No. 399,253, filed on Aug. 28, 1989, now abandoned.

TECHNICAL FIELD

This invention relates to apparatus and methods for forming composite doors for use in automotive applications and more particularly to apparatus and methods for forming such doors having a plastisol skin cover with an integral 360° sail pocket, a projection which has the physical appearance of a sail, formed therein for defining a demister opening for directing air across a door window for removing fog therefrom.

BACKGROUND PRIOR ART

Composite door constructions are known in which a plastisol skin cover is foamed with respect to a substrate which forms the structural support for the door construction. Such composites are typically manufactured by apparatus and methods which include use of a mold cavity having a lid which is opened and closed with respect to the mold cavity to enable a preformed plastisol skin to be supported in the mold cavity. Foam precursors are then placed on the skin cover and the lid is closed to support the substrate with respect to the cover to form a foam space therebetween into which the foam precursors flow and react to form a foam layer between the cover and the substrate.

U.S. Pat. Nos. 4,303,720; 4,420,447 and 4,447,504 disclose processes and apparatus for forming a panel construction in which a substrate is supported on a mold lid for a mold cavity in which the plastisol skin cover is supported for foaming and wherein the insert is bonded to the skin by the foam for providing structural support.

While suitable for their intended purpose such processes do not provide for formation of dielocked features in the skin cover of the composite structure.

U.S. Pat. No. 4,572,856 discloses one approach to reinforcing die-locked (i.e. a portion of a molded product which cannot be directly lifted from a female mold cavity until a portion of the mold apparatus is removed from the molded product) feature on an instrument panel cluster portion of a composite panel in an instrument panel construction. However, it does not provide a method for centering a substrate extension in a die-locked pocket.

The aforesaid processes and apparatus for performing the processes do not provide for centering and foaming of substrate or insert structures within die-locked features of a vinyl skin covering on a composite structure.

SUMMARY OF THE INVENTION

A feature of the present invention is to provide apparatus which simplifies the manufacture of die-locked features on composite panel constructions including an outer plastisol cover, a foam layer and a reinforcing substrate or insert.

A further feature of the present invention is to include mold apparatus for foaming a plastisol cover with respect to a reinforcement substrate wherein the plastisol cover has a die-locked pocket feature thereon and to do so by use of slide means for centering the substrate within the pocket feature to form a space for formation of a foam layer between the cover and the substrate while sealing the cover and substrate to prevent leakage of foam into the substrate.

A still further feature of the present invention is to provide the slide means on the lid of a mold apparatus and to operate the slide means in a retracted position as the lid is closed on a mold cavity and to operate the slide means into an extended position when the mold is closed so as to center the substrate within the pocket feature during a foam reaction process.

Yet another object of the present invention is to provide a cover with an integrally formed 360 sail thereon and to provide a hollow substrate extension defining a passage for flow of air to demist a window associated with a composite panel construction and wherein a slide is positioned within the hollow extension to center it within the sail to provide a space for formation of a foam layer between the sail and the hollow substrate extension.

Still another object is to provide an improved method for manufacture of a composite product having a plastisol cover with a die-locked pocket feature formed integrally thereof by steps including forming the plastisol cover and die-locked pocket integrally of one another; locating the cover in a mold cavity having a lid thereon moveable between open and closed positions and carrying a centering tool; directing foam precursors into the mold cavity when the lid is opened; locating a substrate in the pocket and centering the substrate with respect to the pocket by means of the centering tool only when the lid is closed; flowing and reacting the foam precursors in the foam space between the pocket and the substrate and thereafter removing the centering tool from the substrate prior to opening the lid and removing the foamed door from the cavity when the centering tool is removed from the substrate.

In one embodiment of the invention, the apparatus includes a mold cavity having a lid thereon and wherein the mold cavity includes a support surface for a vinyl skin cover having a die-locked feature therein, e.g., a 360° sail for providing a demister opening for defogging a window. The apparatus further includes a centering slide on the lid which is retracted when the lid is opened and extended when the lid is closed to center a hollow substrate extension within the sail. The centered substrate extension forms a foam space adjacent the cover. The substrate extension also engages the cover to form a seal to prevent foam leakage. The apparatus further includes a slide on the mold cavity which will extend when the cover is centered with respect to the cover to seal the demister opening in the sail.

In another embodiment of the present invention a method is provided which includes the steps of preforming a plastisol cover to have a pocket feature therein such as the sail portion of a composite foamed door structure; aligning the plastisol cover in a mold cavity and locating a reinforcing substrate against the cover with a hollow extension thereon extending into the pocket feature; thereafter closing a lid with a retracted centering slide thereon and then extending the centering slide to space the hollow extension with respect to the cover to both form a space for a foam layer produced by reaction of foam precursors while sealing the cover on the extension to prevent foam leakage therethrough.

These and other objects, features and advantages of the invention will be more apparent when taken in conjunction with the following detailed description of the invention with reference to the accompanying drawings wherein:

DETAILED DESCRIPTION OF A PREFERRED EMBODIMENT

Figure 1:
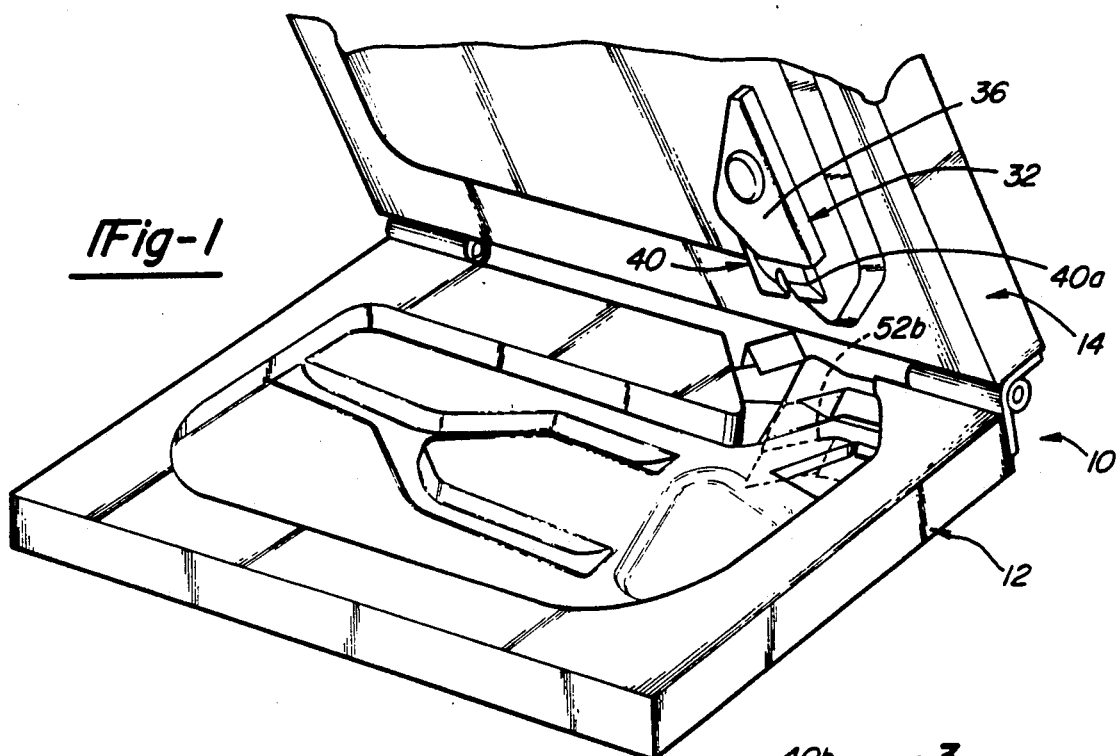
FIG. 1 is a perspective view of mold apparatus in accordance with the present invention.

Referring now to FIG. 1, a mold apparatus 10 is shown having a mold cavity 12 and a lid 14 which is opened to load a plastisol skin cover 16 into the mold cavity 12 against a surface 18 thereon configured in the shape of the skin cover 16.

Figure 4:
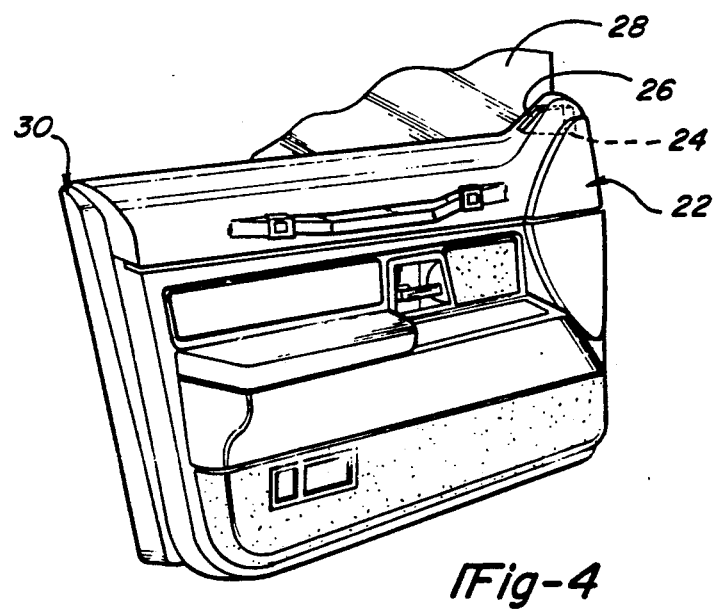
FIG. 4 is a perspective view of a door sail structure produced by the method and apparatus of the present invention.

The mold cavity 12 also receives a substrate or insert 20 which will provide structural support for a resultant foamed panel which, as shown in FIG. 4 is a composite door panel 22 having an integral 360° sail 24 thereon formed with a side window demister port 26 which will direct a stream of air from a suitable source (not shown) against the interior of a window 28 which is carried on a vehicle door 30 by suitable actuating means (not shown) operable to raise and lower the window 28.

In the past, features such as the 360° sail 24 were formed as separable elements connected to a door panel unit. In accordance with the present invention the sail 24 is formed by a process which includes the steps of first forming a plastisol skin cover 16 having an integral 360° sail cover 16a formed thereon with a die locked pocket 16b having an access opening 16c thereto. The plastisol skin cover 16, more particularly is formed by casting liquid or powder thermoplastic resin material against an electroform mold heated to a temperature at which the powder material will adhere and build up as a layer of material. The material is fused during a curing cycle to form the resultant part. Examples of such a slush molding processes are set-forth in U.S. Pat. Nos. 3,315,016; 3,680,629 and 3,728,429, with a common assignee/owner to that of the present application. The plastisol material can be formed of any suitable resin material with plasticizer an example of which is polyvinyl chloride compositions.

Following the formation step, the plastisol skin cover 16 with a die-locked pocket 16b thereon is loaded onto the support surface 18 of a mold cavity to conform thereto; then a substrate 20 is located against the cover 16 and a substrate extension 20a is inserted into the pocket 16b; mold lid 14 is then closed and a centering tool 32 thereon is actuated to engage the substrate extension 20a to center it within the pocket 16b for forming a space 34 for reacting foam precursors and for sealing a surface segment 20c of the substrate 20 against a flange portion 16d of the sail 16 to prevent foam leakage from the substrate 20. Once the sail 16 and substrate extension 20a are centered foam precursors are injected into the foam space 34 by suitable means well-known in the art, an example of which is shown in commonly assigned U.S. Pat. No. 4,743,188. Following reaction of the foam precursors, a foam layer 34a is formed which is bonded to both the cover 16 and the substrate 20.

Figure 2:
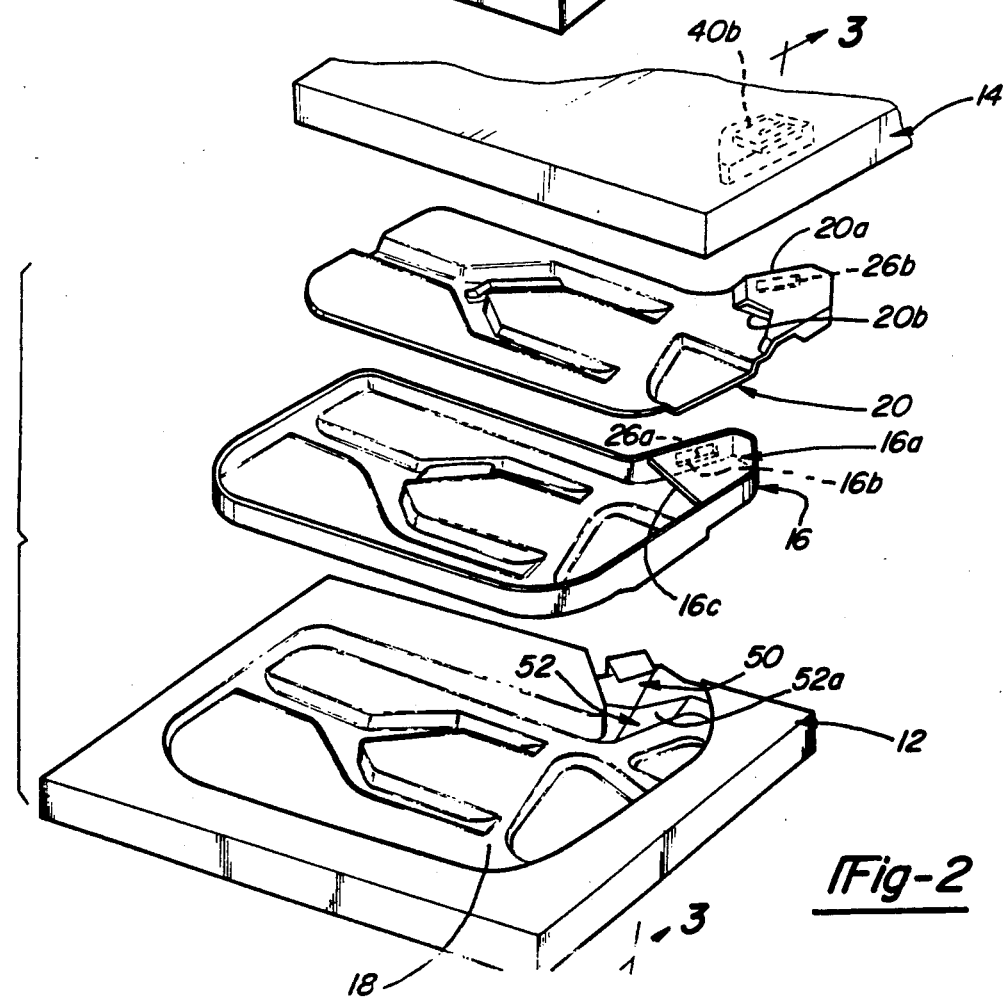
FIG. 2 is a exploded perspective view of the mold apparatus of FIG. 1 in association with plastisol skin cover component and a substrate component foamed in situ by the apparatus of FIG. 1.
Figure 3:
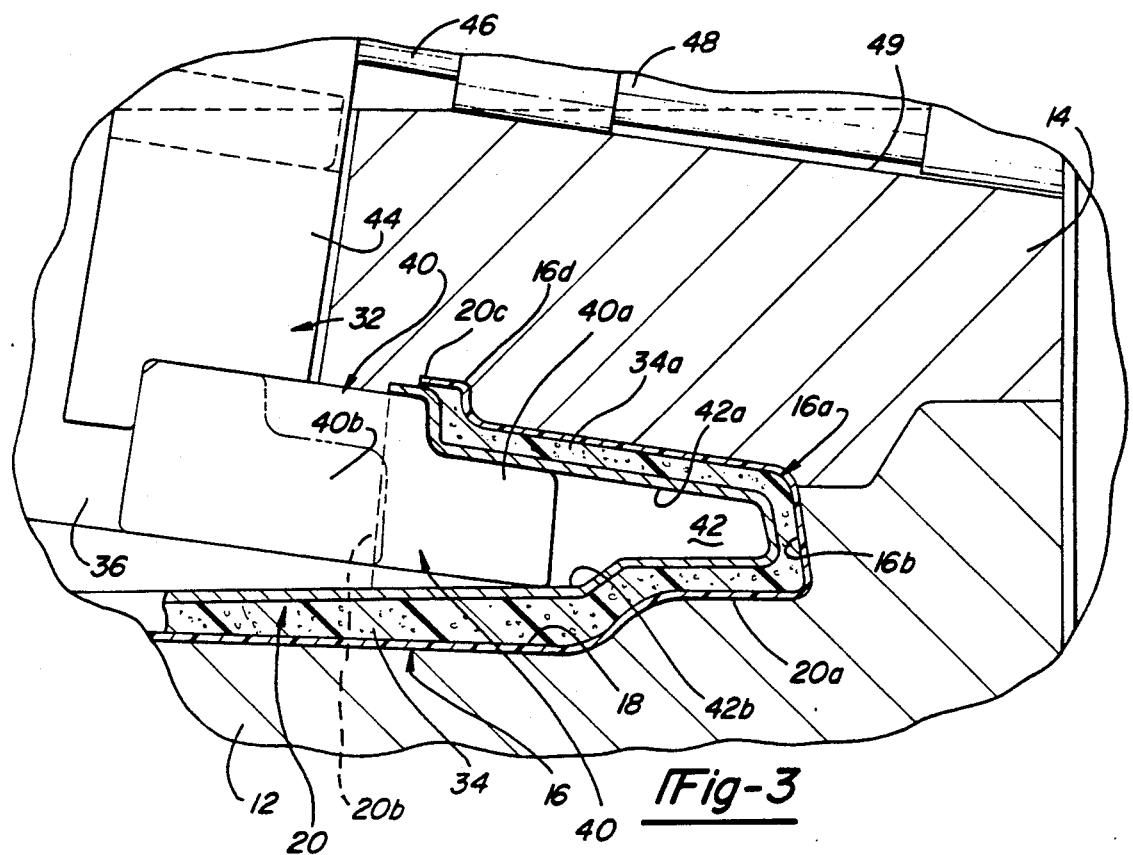
FIG. 3 is a fragmentary sectional view taken along the line 3—3 of FIG. 2, looking in the direction of the arrows showing the components following foaming.

More particularly, the apparatus 10 for performing the aforesaid method includes a centering tool housing 36 on the inner surface 38 of the lid 14. The housing supports a slide 40 for reciprocation with respect thereto between a retracted position within the housing 36 and an extended position outwardly of the housing 36 a distance which will cause the slide 40 to enter the interior 42 of the substrate extension 20a to engage the walls 42a, 42b thereof as best shown in FIG. 3. When the slide 40 assumes the retracted position 40b (broken line FIG. 2) the lid 14 can be freely closed without interference with the substrate 20 loaded in the cavity 12. Once the lid 14 is closed the slide 40 is aligned with an entrance 20b to the extension 20a such that actuation of the slide 40 will cause it to move therethrough into its extended position 40a for producing the combined centering and sealing functions of the method of the present invention. In the illustrated embodiment the slide 40 is connected to a carriage member 44 that extends through the lid 14 for connection to the rod portion 46 of a power cylinder 48 carried on the outer surface 49 of the lid 14 all as shown in FIG. 3.

A further feature of the apparatus 10 is that a slide assembly 50 is located in the cavity 12 with a slide element 52 moveable between a retracted position 52a which enables the cover 16 to be loaded into the cavity 12 without interference. Once loaded the cover 16 has the demister opening 26a therein located in alignment with the slide element 52. When the mold is closed the slide element 52 is moved to its extended position 52b where it will contact the skin or cover 16 to form a removable core around which foam is formed. The slide 52 is covered with a suitable release agent to be removed from the foam layer to form a vent hole for passage of air through the demister opening 26a in the cover 16 and the demister opening 26b in the substrate 20.

INDUSTRIAL APPLICABILITY

While the present invention has been illustrated with respect to apparatus for the manufacture of door panels with 360° sails thereon it is equally applicable to the formation of other composite foam panels having a die-locked pocket thereon. For example the apparatus and method would be suitable for the formation of integral hollow 360° Featured on other interior trim products for automobiles including consoles, instrument panels and headers. The apparatus and method are equally suitable for use in the manufacture of composite articles including luggage, sports equipment and seating having a plastisol skin cover, a substrate and a foam layer bonding them together in a panel construction.

While representative embodiments of apparatus and methods of the present invention have been shown and discussed, those skilled in the art will recognize that various changes and modifications may be made within the scope and equivalency range of the present invention as set forth in the following claims.

What is claimed is:

1. A process for making a composite foamed door having a plastisol skin cover thereon with an integral sail portion with a demister hole therein comprising the steps of:

casting plastisol against a heated mold to form a skin cover having a pocket at one end thereof with an opening therein;

locating the skin in a mold cavity having a lid thereon moveable between open and closed positions;

providing a substrate including a first portion backing said skin cover and including a second portion insertable into the pocket;

locating the substrate in backing relationship to the skin cover and inserting the second portion into the pocket;

providing a centering tool on the lid moveable with respect to the lid between retracted and extended positions;

closing the lid when the centering tool is in its retracted position;

thereafter positioning the centering tool in its extended position to engage the second portion of the substrate and to center the substrate within the pocket to form a space between the second portion of the substrate and walls of the pocket;

flowing and reacting foam precursors into the space only when the lid is closed to form a foamed interior product; and retracting the centering tool from the substrate and removing the foamed interior product from the mold cavity.

* * * * *